(12) United States Patent
Bar-Niv et al.

(10) Patent No.: US 8,472,351 B2
(45) Date of Patent: Jun. 25, 2013

(54) FAST ETHERNET AND HDMI ETHERNET CHANNEL PHYSICAL LAYER CIRCUIT

(75) Inventors: Amir Bar-Niv, Sunnyvale, CA (US); Genady Veytsman, Netanya (IL)

(73) Assignee: TranSwitch Corporation, Shelton, CT (US)

( * ) Notice: Subject to any disclaimer, the term of this patent is extended or adjusted under 35 U.S.C. 154(b) by 787 days.

(21) Appl. No.: 12/607,524

(22) Filed: Oct. 28, 2009

(65) Prior Publication Data

US 2011/0096793 A1    Apr. 28, 2011

(51) Int. Cl.
*H04L 12/66* (2006.01)

(52) U.S. Cl.
USPC .......................................... 370/257; 370/463

(58) Field of Classification Search
None
See application file for complete search history.

(56) References Cited

U.S. PATENT DOCUMENTS

| | | | |
|---|---|---|---|
| 6,901,059 B2 | 5/2005 | Liu | |
| 8,176,214 B2 * | 5/2012 | Jones et al. | 710/14 |
| 2008/0062965 A1 * | 3/2008 | Silva et al. | 370/352 |
| 2008/0187028 A1 * | 8/2008 | Lida | 375/140 |
| 2009/0201421 A1 * | 8/2009 | Mawatari et al. | 348/553 |
| 2009/0328100 A1 * | 12/2009 | Horiguchi | 725/39 |
| 2011/0025914 A1 * | 2/2011 | McRae et al. | 348/552 |
| 2011/0181781 A1 * | 7/2011 | Oh et al. | 348/565 |
| 2012/0002562 A1 * | 1/2012 | Kawade | 370/252 |

OTHER PUBLICATIONS

HDMI Licensing, LLC, "High-definition Multimedia Interface Specification Version 1.4, Supplement 2, HDMI Ethernet and Audio return Channel (HEAC)", date of publication: Jun. 5, 2009.

* cited by examiner

*Primary Examiner* — Hassan Kizou
*Assistant Examiner* — Roberta A Shand
(74) *Attorney, Agent, or Firm* — Myers Wolin, LLC

(57) ABSTRACT

A Fast Ethernet and HDMI Ethernet channel (HEC) physical layer circuit. The physical layer circuit comprises a Fast Ethernet physical layer module implementing a physical layer specification of a Fast Ethernet communication standard; a hybrid circuit connected to the fast Ethernet physical layer module using a first twisted-pair wire and a second twisted-pair wire and capable of processing transmit and receive HDMI Ethernet channel (HEC) signals concurrently transported over a third twisted-pair wire; a switch for bypassing the hybrid circuit; and a controller for controlling the operation the hybrid circuit and the switch according to the operating mode of the physical layer circuit, wherein the operation mode of the physical layer circuit is any of a fast Ethernet and a HEC.

15 Claims, 5 Drawing Sheets

FAST ETHERNET AND HDMI ETHERNET CHANNEL PHYSICAL LAYER CIRCUIT

TECHNICAL FIELD

This invention generally relates to the connectivity of electronic display devices and network devices.

BACKGROUND OF THE INVENTION

The high-definition multimedia interface (HDMI) is a compact audio/video connector interface for transmitting uncompressed digital streams. The HDMI connects a digital multimedia (or audio/video) source (e.g., a set-top box, a DVD player, a personal computer, a video game console, etc.) to a compatible digital sink, such as a digital television.

A HDMI cable is a transport medium including three transition minimized differential signaling (TMDS®) channels utilized to transfer video, audio, and auxiliary data encapsulated in TDMS characters, and the transmission is synchronized using a high-frequency clock signal running over a clock channel. The TDMS and clock channels are differential pairs. A HDMI cable also includes the following channels: a display data channel (DDC_SCL and DDC_SDA), a consumer electronics control (CEC), and a hot-plug detect (HPD) signal which originates at the sink.

Recently, the HDMI standard has been enhanced to include an addition of a high-speed full-duplex data communication link (referred to as a HDMI Ethernet Channel (HEC)) that conforms to the 100Base-TX defined in the IEEE 802.3 standard. In the HEC mode, a source and sink device exchange 100Base-TX data through a differential pair, i.e., a single pair of wires is used to transmit and receive simultaneously. In addition, signals (e.g., data frames) are transmitted with attenuated amplitude, compared to the normal 100Base-TX Ethernet signals, on a set of biased lines. The utility and HPD wires in a HDMI cable have been defined to be the differential pair for the HEC communication. The HEC specification is fully described in the HDMI Specification version 1.4, Supplement 2, (hereinafter the "HDMI Standard" published on Jun. 5, 2009, incorporated herein by reference merely for the useful understanding of the background of the invention.

Although designed to support 100Base-TX communication, the HEC is not fully compliant with the Ethernet standard (IEEE 802.3). Specifically, the physical (PHY) layer of the HEC is purposely designed to be different than the PHY layer defined in the IEEE 802.3 standard. Typically, a PHY layer of a communication standard consists of the basic hardware transmission technologies of a network. The most common form of a physical medium used for Ethernet transmission is a twisted pair cable and 8P8C modular connectors also known as RJ45 connectors.

A prime example for the difference between the PHY physical layers of HEC and Ethernet is that HEC is operable only in HDMI devices utilizing connection by means of HDMI cables, thus a standard RJ45 connector is not compatible with the HEC specification. Furthermore, the Ethernet standard defines a half-duplex communication between two devices, where one differential pair is utilized for reception and another differential pair is for transmission. Also, as noted earlier, the HEC signals are attenuated compared to the normal 100Base-TX Ethernet signals.

The fact that the HEC is not fully compliant with the Ethernet standard, limits HDMI devices from being connected to standard network devices, such as routers, hubs, switches, and so on. As a result, an HDMI device cannot support both 100Base-TX Ethernet and HEC. That is, a standard HEC physical layer module cannot drive both HEC and Ethernet connections. This is a limiting factor as a user cannot select a desirable mode of communication for the HDMI device.

The HDMI Standard suggests providing a switch that includes PHY layer modules of both HEC and Ethernet. That is, a PHY layer module of an HEC and a PHY layer of an Ethernet are both fabricated on a chip to support both communication modes. However, in this solution each PHY layer module can operate only according to its respective communication mode.

It would be therefore advantageous to provide a single PHY circuit that supports and drives both the Ethernet and HEC communication standards.

SUMMARY OF THE INVENTION

Certain embodiments of the invention include a Fast Ethernet and HDMI Ethernet channel (HEC) physical layer circuit. The physical layer circuit comprises a Fast Ethernet physical layer module implementing a physical layer specification of a Fast Ethernet communication standard; a hybrid circuit connected to the Fast Ethernet physical layer module using a first twisted-pair wire and a second twisted-pair wire and capable of processing transmit and receive HDMI Ethernet channel (HEC) signals concurrently transported over a third twisted-pair wire; a switch for bypassing the hybrid circuit; and a controller for controlling the operation the hybrid circuit and the switch according to the operating mode of the physical layer circuit, wherein the operation mode of the physical layer circuit is any of a fast Ethernet and a HEC.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
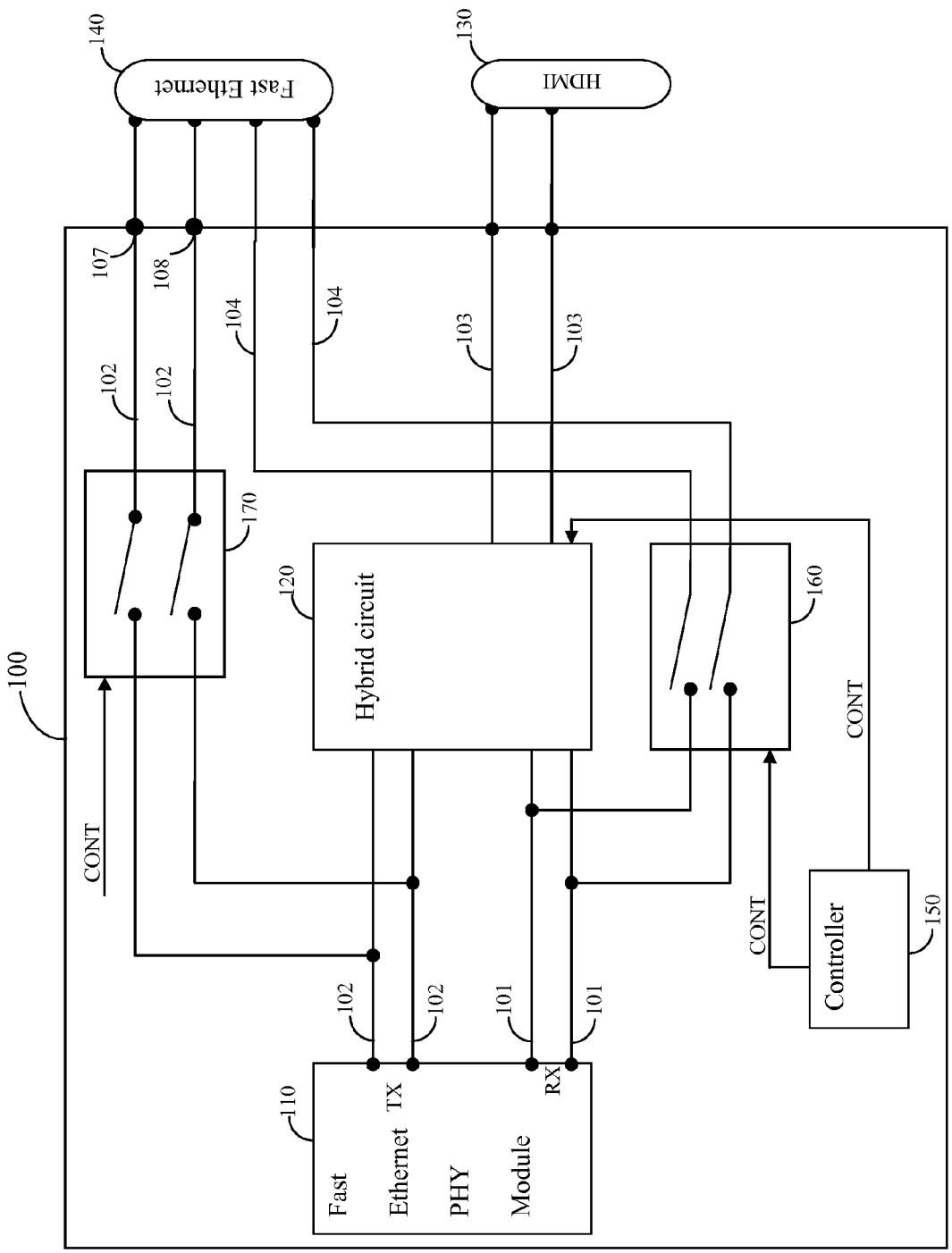
FIG. 1 is a diagram of a PHY layer circuit implemented in accordance with an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The invention employs a physical layer circuit that supports and drives both a Fast Ethernet and a HDMI Ethernet Channel (HEC) without duplicating the PHY layer modules of the respective communication standards. FIG. 1 shows an exemplary diagram of a PHY layer circuit 100 provided in accordance with an embodiment of the invention. The PHY layer circuit 100 includes a Fast Ethernet PHY module 110 that employs the physical layer for a Fast Ethernet communication standard. The Fast Ethernet may be, but is not limited to, 10Base-T, 100Base-TX, 1000Base-T (Gigabit Ethernet), 10 GBase-T, any Ethernet optical communication standard, and the like.

The Fast Ethernet module 110 is coupled to a hybrid circuit 120 using two twisted-pair wires 101 and 102 that carry receive (RX) and transmit (TX) signals. The hybrid circuit 120 is used to join transmit and receive signals on a single twisted-pair wire 103 or to separate received signals from signals traveled over the twisted-pair wire 103. Therefore, the hybrid circuit 120 is utilized to form HEC signals. In accordance with an embodiment of the invention, the hybrid circuit 120 attenuates the transmit signals to a level defined by the HDMI Standard. In another embodiment, the PHY layer circuit 100 may include an attenuator (not shown) adapted to attenuate signals transmitted over the twisted-pair wire 103. The hybrid circuit 120 may be, for example, a hybrid balanced network. Other types of hybrid circuits that can be utilized as the hybrid circuit 120 would be apparent to one of ordinary skills in the art.

As illustrated in FIG. 1, the twisted-pair wire 103 is wired to a HDMI connector 130 (to the HPD and utility pins). The twisted-pair wires 102 and 104 are also connected to the Ethernet connector 140 either to the TX or RX pins. In the exemplary embodiment shown in FIG. 1, the twisted-pair wire 102 and 104 are respectively connected to the TX and RX pins of the connector 140. The signals on the wire 104 are received through the switch 160. The Ethernet connector 140 may be, but is not limited to, a RJ45, a power line communications (PLC) Ethernet adapter, and the like.

The PHY layer circuit 100 also comprises a controller 150 adapted to configure the hybrid circuit 120 and a switch 160 according to the mode of operation, i.e., fast Ethernet or HEC. Specifically, when operating in a HEC mode the hybrid circuit 120 separates the RX signals from mixed signals on the twisted-pair wire 103. As mentioned earlier, transmit and receive HEC signals are transported concurrently over the twisted pair wire 103. In addition, the hybrid circuit 120 (or the attenuator) is set to attenuate the amplitude of transmitted signals. In order to avoid any transmission of signals or noise, any output through pins 107 and 108 is disabled. In one embodiment of the invention the pins 107 and 108 are disabled using a switch 170 which is operable under the control of the controller 150. In another embodiment, the pins 107 and 108 are disabled by keeping the pins 107 and 108 unconnected.

In the Fast Ethernet mode the hybrid circuit 120 is bypassed, using the switch 160, thus signals received on the twisted-pair wire 103 are directly transferred to the Fast Ethernet module 110 through the twisted-pair wire 101. In addition, the pins 107 and 108 are enabled to allow transmission of signals through the twisted-pair wire 102. In one embodiment of the invention the pins 107 and 108 are enabled by the switch 170 which is operable under the control of the controller 150. It should be noted that for both modes of operation the PHY layer circuit 100 is capable of supporting either a half-duplex transmission or a full-duplex transmission the type of the transmission is typically determined by the MAC layer.

In accordance with one embodiment, the mode of operation may be manually selected, for example, using a remote control of the HDMI device (e.g., a TV or a DVD player) in which the PHY layer circuit 100 is embedded. In accordance with another embodiment the operation mode may be automatically set by sensing which of connectors 130 or 140 is active.

Figure 2A:
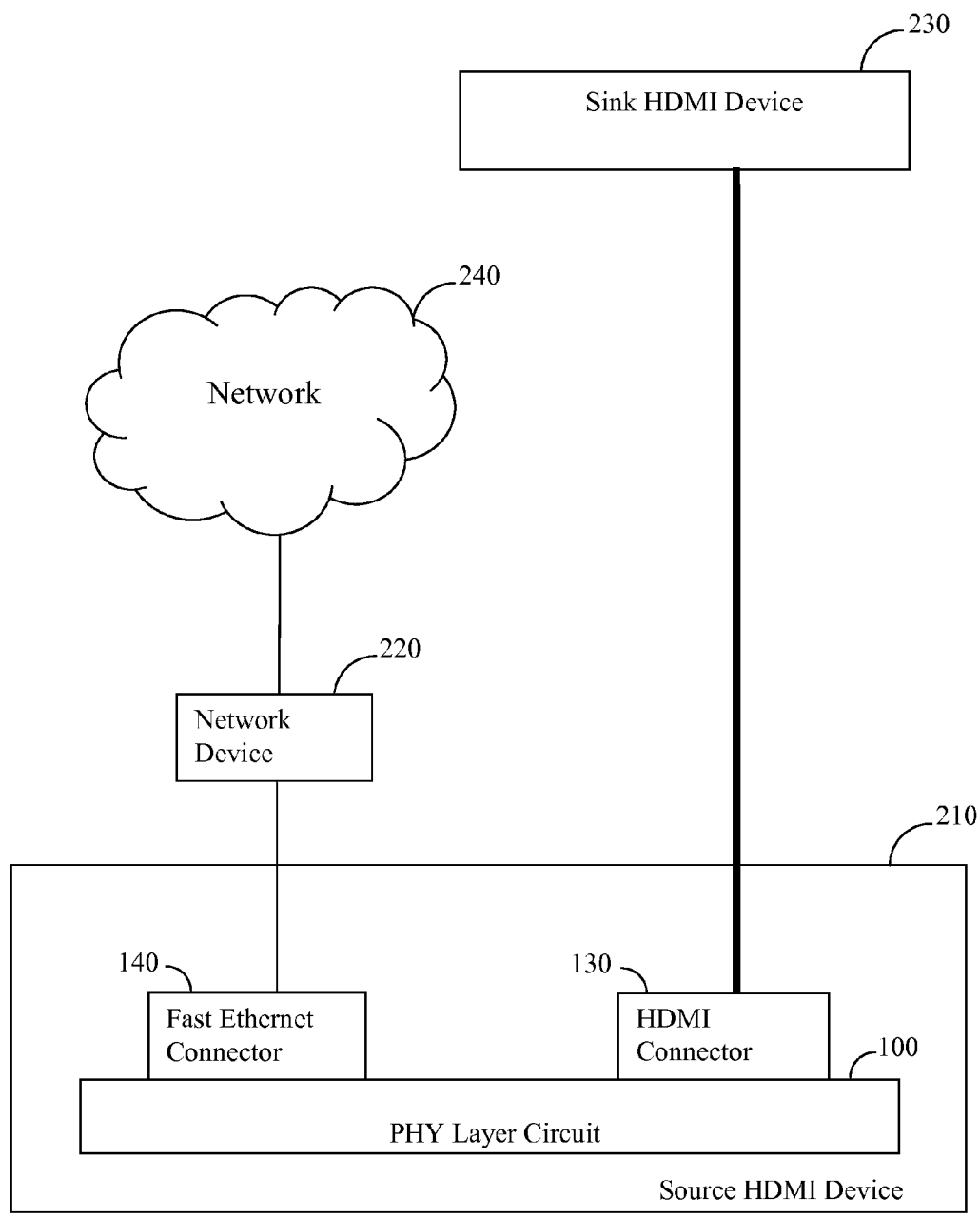
FIGS. 2A, 2B and 2C are diagrams illustrating various network topologies constructed using the PHY layer circuit.

The PHY layer circuit 100 may be embedded in at least one of a sink HDMI device, a source HDMI device, and a HDMI repeater, and the like. FIG. 2A shows a network topology 200 constructed in accordance with an embodiment of the invention. In this embodiment, the PHY layer circuit 100 is embedded in a source HDMI device 210, thereby connecting the source device 210 directly to a network device 220, through the Fast Ethernet connector 140, and to a sink HDMI device 230 through the HDMI connector 130. The network device 220 may be, but is not limited to, a switch, a hub, a modem, a router, a wireless router, and the like. The network device 220 facilitates the communication to a network 240 which may be, but is not limited to, a local area network (LAN), a wireless LAN, a wide area network (WAN), and the like. The source HDMI device 230 may be, but is not limited to, a DVD player, a setup box, and the like.

As a non-limiting example the network topology, shown in FIG. 2A, may be used to download images to the source HDMI device 210 through the network 240 and display the images over the sink HDMI device 230. Accordingly, the user sets the PHY layer circuit 100 to operate in a Fast Ethernet mode, thereby connecting the source HDMI device 210 to the network 240. Once the images are downloaded, the user may switch to a HEC mode to send the images to the sink device 230 over the HDMI cable.

Figure 2B:
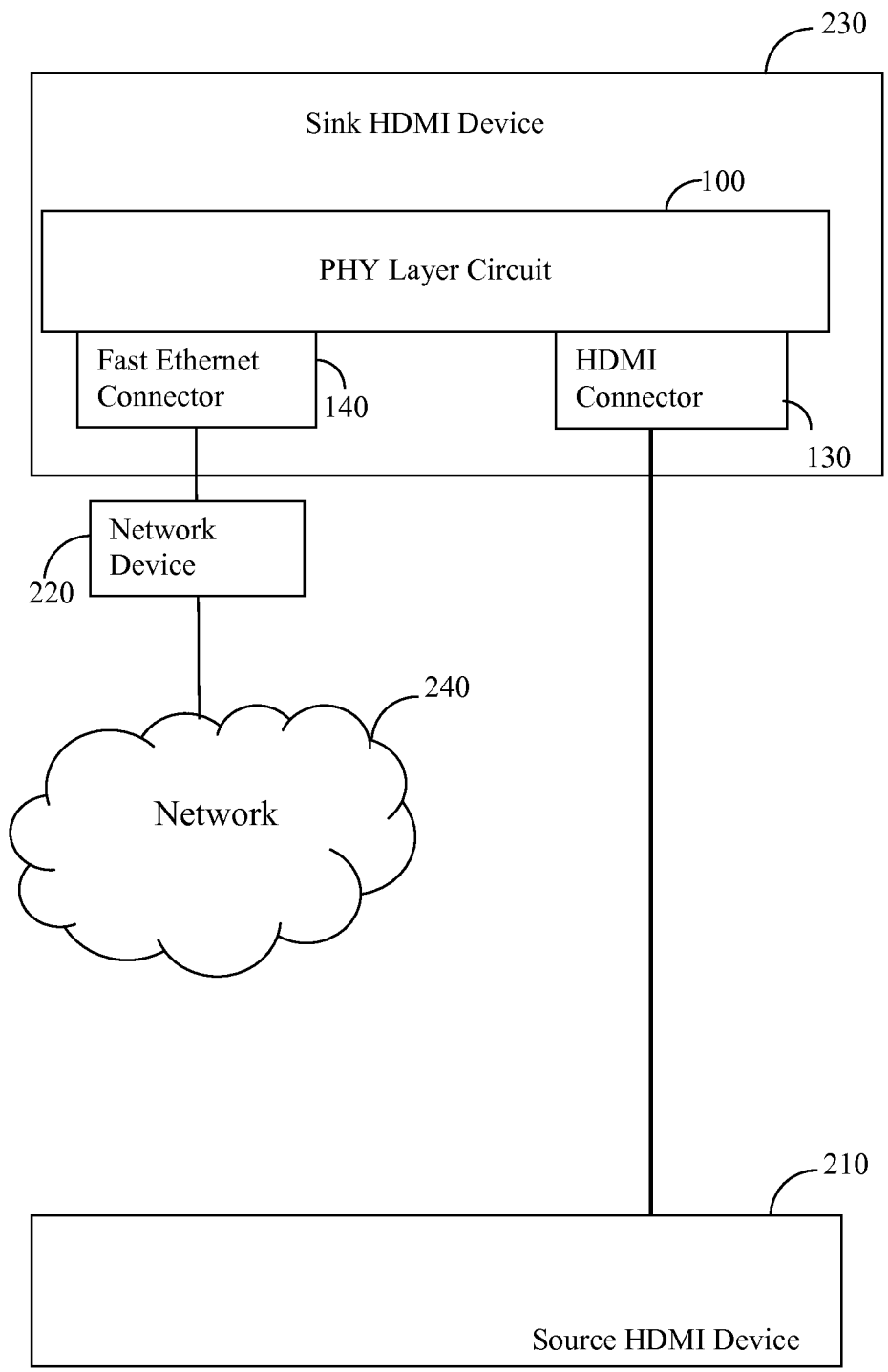

As illustrated in FIG. 2B in another network topology, the sink HDMI device 230 may be also connected to a network 240 by means of a network device 220 through the Ethernet connector 140. The source and sink devices 210 and 230 are connected using a HDMI cable. In other implementations the sink and source devices 230 and 210 may be connected through a HDMI repeater (not shown). As a non-limiting example, the network topology, shown in FIG. 2B, may be used to browse the Internet from a sink HDMI device 230 (which may be a TV set). The connection to the Internet (e.g., network 240) can be facilitated either through the Fast Ethernet connector 140 or the HDMI connector 130. As the sink device 230 can receive and display data only from a single source, only a single PHY module (either a fast Ethernet or HEC) can be active at a time. Therefore, the PHY circuit 100 is very efficient in comparison to other dual PHY modules solutions. As only one PHY module can be active, having a single PHY layer circuit 100 that can drive both modes of communications is an advantage over prior art solutions.

Figure 2C:
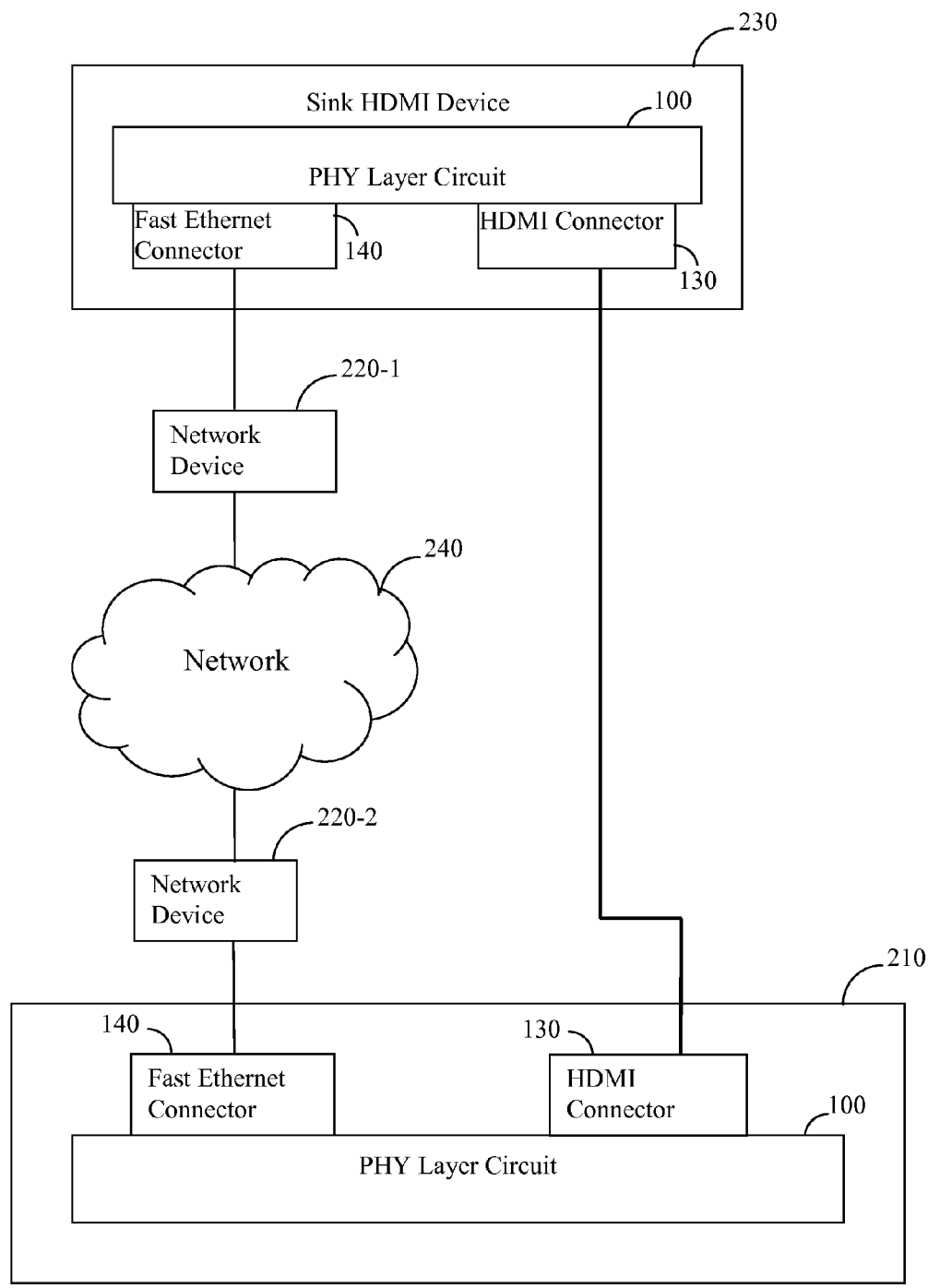

Another network topology constructed in accordance with an embodiment of the invention is shown in FIG. 2C. In this embodiment, both the source and sink devices 210 and 230 are connected to a network 240 by means of network devices 220-1 and 220-2 through the Ethernet connector 140. The sink and the source devices 230 and 210 are connected using a HDMI cable. In other implementations the sink and source devices 230 and 210 may be connected through a HDMI repeater (not shown). It should be appreciated that all the topologies illustrated in FIGS. 2A, 2B and 2C, the PHY layer circuit 100 enable communication using the HEC or Fast Ethernet.

Figure 3:
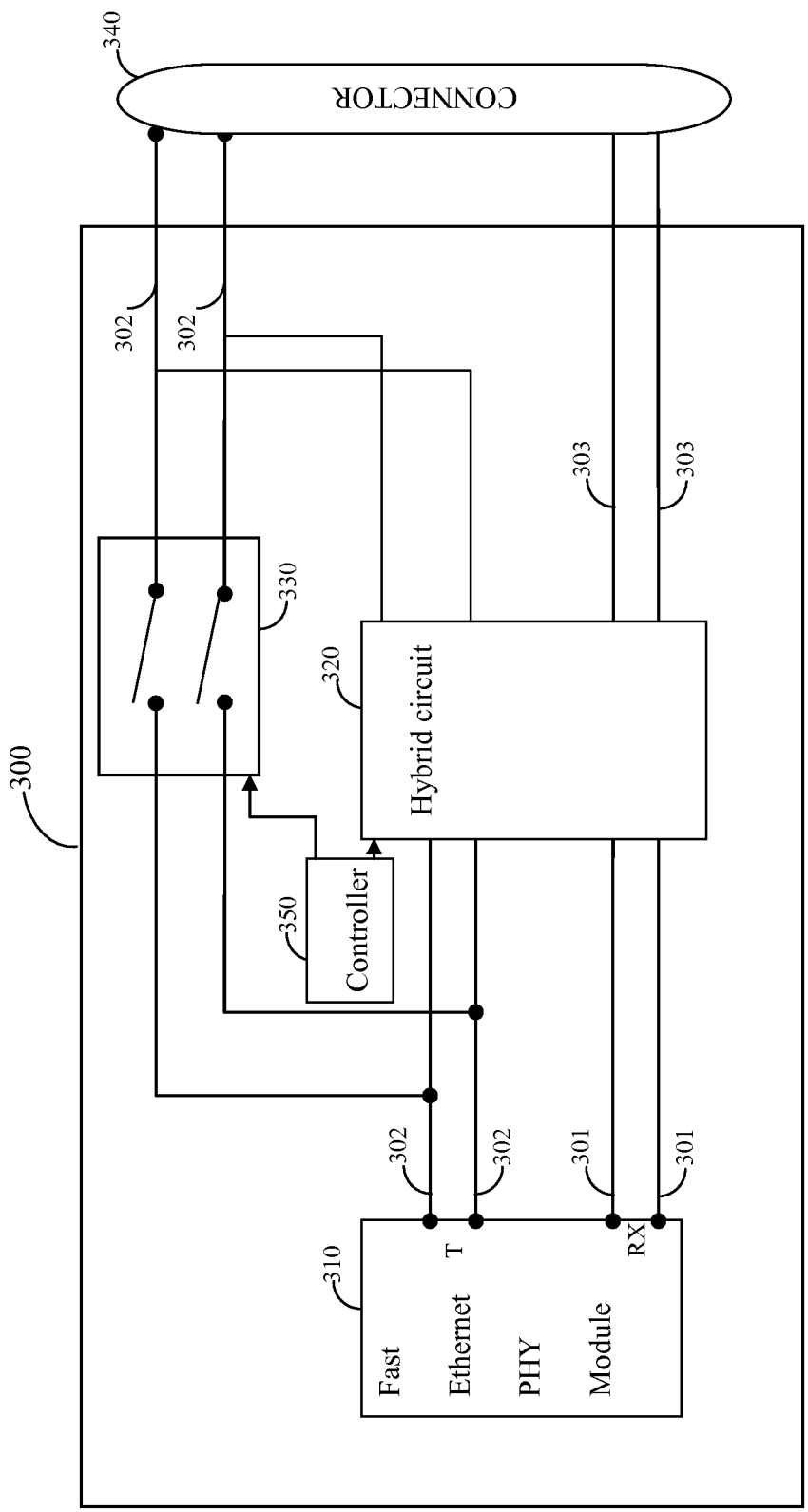
FIG. 3 is a diagram of a PHY layer circuit implemented in accordance with another embodiment of the invention.

FIG. 3 is a diagram of a PHY layer circuit 300 implemented in accordance with another embodiment of the invention. The circuit 300 includes a Fast Ethernet PHY layer module 310 connected to a hybrid circuit 320 and a switch 330. The PHY layer circuit 300 is connected to a connector 340 which may be either a RJ45 or a HDMI. In the embodiment shown in FIG. 3, twisted-pair wires 301 and 302 respectively carry receive and transmit Fast Ethernet signals, while on a twisted-pair wire 303 either receive Fast Ethernet signals or receive and transmit HEC signals are transported. That is, in a Fast Ethernet mode of operation the wire 303 carries only receive signals. The switch 330 is used for bypassing the hybrid circuit 320 when the PHY layer circuit 300 operates in a Fast Ethernet mode. When the PHY layer circuit 300 is in the HEC operation mode, the switch 330 is off (i.e., disconnected) and signals traveled on the wire 303 are processed by the hybrid circuit 320 as described above. The PHY layer circuit 300 may further include a controller 350 to set the PHY layer circuit 300 to operate in the desired mode of operation, by controlling the hybrid circuit 320 and the switch 330.

It should be appreciated that the PHY layer circuit 300 provides an integrated circuit (IC) or a chip designer with the flexibility to easily configure the PHY layer circuit 300 to process signals in either one of the HEC or Fast Ethernet communication modes.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

The invention claimed is:

1. A physical layer circuit, comprising:
   a Fast Ethernet physical layer module implementing a physical layer specification of a Fast Ethernet communication standard;
   a hybrid circuit connected to the Fast Ethernet physical layer module using a first twisted-pair wire and a second twisted-pair wire and configured to process transmit and receive HDMI Ethernet channel (HEC) signals concurrently transported over a third twisted-pair wire joining transmit signals transported over the second twisted-pair and receive signals transported over the first twisted-pair wire to be concurrently transported over the third twisted-pair wire; and separating receive and transmit signals traveled over the third twisted-pair wire to be transported over the first twisted-pair wire and the second twisted-pair wire respectively;
   a switch for bypassing the hybrid circuit; and
   a controller for controlling the operation the hybrid circuit and the switch according to the operating mode of the physical layer circuit, wherein the operation mode of the physical layer circuit is any one of a Fast Ethernet and a HEC.

2. The circuit of claim 1, wherein the Fast Ethernet physical layer is connected to a Fast Ethernet connector using the second twisted-pair wire and a fourth twisted-pair wire.

3. The circuit of claim 2, wherein the connection between the Fast Ethernet physical layer and the Fast Ethernet connector using the fourth twisted-pair wire is through the switch.

4. The circuit of claim 3, wherein the fourth twisted-pair wire carries fast Ethernet receive signals and the second twisted-pair wire carries fast Ethernet transmit signals.

5. The circuit of claim 1, wherein the hybrid circuit is connected to a HDMI connector using the third twisted-pair wire.

6. The circuit of claim 1, wherein the hybrid circuit further attenuates transmit signals generated by the fast Ethernet physical module and transported over the second twisted-pair wire.

7. The circuit of claim 1, wherein the Fast Ethernet communication standard includes at least one of: 10Base-T, 100Base-TX, 1000Base-T, and 10 GBase-T.

8. The circuit of claim 1, is adapted to provide direct communication with a network device and a high definition multimedia interface (HDMI) device.

9. The circuit of claim 1, wherein the hybrid circuit is bypassed during the Fast Ethernet operation mode.

10. The circuit of claim 1, wherein the controller generates a control signal to control the switch and the hybrid circuit, wherein the control signal can be generated upon selection of the operation mode by any one of: a user and automatically sensing the state of a fast Ethernet connector to a HDMI connector to which the physical layer circuit is coupled.

11. A physical layer circuit, comprising:
    a Fast Ethernet physical layer module implementing a physical layer specification of a Fast Ethernet communication standard;
    a hybrid circuit connected to the Fast Ethernet physical layer module using a first twisted-pair wire and a second twisted-pair wire and configured to process transmit and receive HDMI Ethernet channel (HEC) signals concurrently transported over a third twisted-pair wire by joining transmit signals transported over the second twisted-pair and receive signals transported over the first twisted-pair wire to be concurrently transported over the third twisted-pair wire, and separating receive and transmit signals travelled over the third twisted-pair wire to be transported over the first twisted-pair wire and the second twisted-pair wire respectively; and
    a switch for bypassing the hybrid circuit, wherein the Fast Ethernet layer module is connected to a connector using the second twisted-pair wire and the third twisted-pair wire and the hybrid circuit is connected to the connector using the third twisted-pair, the connector is any one of a fast Ethernet connector or a HDMI connector.

12. The circuit of claim 11, further comprising a controller for controlling at least the switch and the hybrid circuit according to an operation of the physical layer circuit, wherein the operation mode of the physical layer circuit is any of a Fast Ethernet and a HEC.

13. The circuit of claim 11, wherein the hybrid circuit is bypassed during the Fast Ethernet operation mode.

14. The circuit of claim 11, wherein the hybrid circuit further attenuates transmit signals generated by the fast Ethernet physical module and transported over the second twisted-pair wire.

15. The circuit of claim 11, wherein the Fast Ethernet communication standard includes at least one of: 10 Base-T, 100Base-TX, 1000Base-T, and 10 GBase-T.

* * * * *